Patented June 16, 1942

2,286,636

UNITED STATES PATENT OFFICE 2,286,636

INSECTICIDE

Charles W. Murray, Glenside, Pa., assignor to Claude R. Wickard, as Secretary of Agriculture of the United States of America, and his successors in office No Drawing. Application October 1, 1941, Serial No. 413,114

3 Claims. (Cl. 167—34)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

The general purpose of this invention is to provide a more efficient carrier for such alkaloids as nicotine, anabasine, coniine, etc.

Nicotine and other alkaloids have been used as insecticides in the form of salts such as tannate, sulfate, bentonite, etc. It is believed that nicotine in such form is not as toxic as the pure alkaloid. Nicotine alkaloid is generated in certain field dusts and sprays by mixing alkaline materials together with the nicotine combinations. This procedure is inefficient because the evolution of nicotine vapor cannot be carefully controlled.

An important and valuable feature of this invention is the fact that the nicotine vapor is evolved slowly and continuously over a period of days rather than rapidly in a few hours as occurs with mixtures of a nicotine salt and a base such as lime. In numerous experiments ground rubber, both hard and soft, gave off nicotine vapors continuously for periods in excess of 20 days. The original nicotine content ranged from 7.0% to 9.0% and at the end of 12 days the nicotine remaining in the rubber particles approximated 3.0%. Later tests showed nicotine still being evolved even after 20 days.

Experiments with two of the synthetic rubbers, one a chloroprene polymer and the other a butadiene polymer, indicate that these materials are just as good as natural rubber in taking up nicotine.

I am aware of Patents 2,145,284 and 2,203,274 in which alkaloids are used in conjunction with rubber latex and rubber. In these patents the alkaloid is not in the rubber globule or rubber sheet except in minute amounts. Under conditions described in these patents the alkaloids are almost entirely in the water phase. The poisonous constituent is, therefore, lost in a few hours after use. In rubber latex suspensions the colloidal hydrocarbon particle is enclosed by a protein layer that is difficult of penetration. My experiments show that rubber latex suspensions and ground rubber particles will not take up more than a fraction of 1% of nicotine if the latter is in water solution. For maximum absorption the nicotine should be in the anhydrous form.

My invention places the free nicotine alkaloid in the rubber in contrast to the above patents which utilize nicotine in the water phase.

This invention provides a means whereby nicotine may be used efficiently either as a dust or a spray in the form of the free alkaloid. It also provides an insecticide that is unaffected by rain in that the nicotine is not washed out of the carrier, a distinct disadvantage of many other nicotine combinations. The three major factors influencing the evolution of nicotine vapor from the carrier are: temperature, size of rubber particle and concentration of nicotine in the carrier. The latter two may be controlled carefully, and the first need not be controlled in field operations since conditions are favorable for efficient utilization of the nicotine. In other words, the higher the temperature, the more active the insect and the more rapid the evolution of nicotine vapor.

Another object of this invention is to disclose methods and means for the preparation of insecticidal materials comprising the combination of a volatile poisonous alkaloid and rubber and various forms of same such as hard rubber, vulcanized rubber, crepe rubber, smoked latex, etc. Also combinations of volatile poisonous alkaloids and synthetic rubbers as chloroprene polymers, butadiene polymers and co-polymers, organic polysulfides, isobutene polymers, plasticized vinyl chloride polymers, and dimethylbutadiene polymers.

It has been found that liquid alkaloids of 99% purity or more will dissolve in, or be absorbed by, high polymeric compounds such as hard rubber and other materials as mentioned above. When these materials are in finely divided form they very readily take up the alkaloids to the extent of 10% without undue swelling or becoming sticky or soft. These facts enable me to produce a hard, dusty material containing relatively large amounts of liquid alkaloid, suitable for use as dusts or sprays against insects, either as such or after diluting with a suitable inert ingredient.

Preferably the materials used in making an insecticide dust are a finely ground hard rubber with or without an inert filler and 99% nicotine alkaloid and oil.

For the purpose of illustration the invention will be described as applied to a method for the preparation of an insecticidal dust containing 80% hard rubber dust, 10% nicotine alkaloid and 10% oil. The latter is added to confer better adhering qualities to the dust, and it also may confer ovicidal properties on same. It is to be understood that the description given herein after and relating to an insecticide of this type, is given for illustrative purposes only, since it represents a suitable product.

320 grams of 200 mesh or finer hard rubber dust (thoroughly dry) is placed in an ordinary household electric mixer. It is advisable, although not necessary, to place a partial cover on the mixing bowl and to place the entire apparatus under a hood. Now add slowly with agitation 40 cc. of 99% nicotine alkaloid. Then add slowly with agitation 40 cc. of cottonseed oil. Continue agitation for several minutes until thoroughly mixed. The mix swells appreciably on the addition of the 80 cc. of oily liquids. The oil and nicotine may, of course, be added together as one solution. Other oils such as mineral oils, kerosene, fuel oil, Diesel oil, and also vegetable and animal oils such as soy bean, peanut, whale, herring, etc. may be used. The concentrated mixture should be kept in a closed container until final mixing with diluent to field strength, since nicotine is evolved slowly and continuously over a long period of time. For example, a sample of hard rubber dust of the composition 70% rubber, 30% sulfur having been impregnated with nicotine alkaloid to the extent of 7.2%, was reduced to 4.8% nine days later. Seven days later the same sample analyzed 3.3% nicotine. During the test the dust was spread out on a paper at room temperature.

Having thus described my invention, what I claim for Letters Patent is:

1. An insecticide containing as its essential active ingredient a mixture of rubber, poisonous liquid alkaloids, and oil.

2. An insecticide containing as its essential active ingredient a mixture in the form of a dust of hard rubber, nicotine alkaloid, and oil.

3. An insecticide containing as its essential active ingredient a mixture in the form of a dust of hard rubber, nicotine alkaloid, and cottonseed oil.

CHARLES W. MURRAY.